United States Patent [19]
Katner

[11] 3,890,324
[45] June 17, 1975

[54] 1H-PYRAZOLO[4,3-C]QUINOL-4(5H)-ONE-3-CARBOXYLIC ACIDS

[75] Inventor: Allen S. Katner, Indianapolis, Ind.

[73] Assignee: Eli Lilly and Company, Indianapolis, Ind.

[22] Filed: Apr. 12, 1974

[21] Appl. No.: 460,641

[52] U.S. Cl.. 260/287 R; 260/256.4 Q; 260/283.54; 260/326 A; 260/326.11; 424/250; 424/258; 424/232
[51] Int. Cl............................................. C07d 33/48
[58] Field of Search ................................ 260/287 R

[56] References Cited
UNITED STATES PATENTS
3,679,699   7/1972   Oppolzer ........................... 260/287

OTHER PUBLICATIONS
Vul'Eson et al., "Chemical Abstracts"–1448g, Vol. 73, (1962).
Ajello, "Chemical Abstracts", Vol. 77:152124w, (1971).

*Primary Examiner*—Donald G. Daus
*Assistant Examiner*—David E. Wheeler
*Attorney, Agent, or Firm*—William E. Maycock

[57] ABSTRACT

1H-Pyrazolo[4,3-c]quinol-4(5H)-one-3-carboxylic acids, useful as anti-inflammatory agents, are prepared by the alkaline hydrolysis of $C_1$-$C_3$ dialkyl pyrazolo[1,5-c]quinazolin-5(6H)-one-1,2-dicarboxylates.

10 Claims, No Drawings

1H-PYRAZOLO(4,3-C)QUINOL-4(5H)-ONE-3-CARBOXYLIC ACIDS

BACKGROUND OF THE INVENTION

This invention relates to 1H-pyrazolo[4,3-c]quinol-4(5H)-one-3-carboxylic acids. More particularly, this invention relates to 1H-pyrazolo[4,3-c]quinol-4(5H)-one-3-carboxylic acids which are useful as anti-inflammatory agents and to a process for preparing said 1H-pyrazolo[4,3-c]quinol-4(5H)-one-3-carboxylic acids.

Mammals, both humans and animals, are known to suffer from various conditions involving inflammmation with concomitant swelling, tenderness, decreased mobility, pain, and fever. While a number of anti-inflammatory agents are effective in the symptomatic treatment of such inflammatory conditions as rheumatoid arthritis, rheumatoid spondylitis, osteoarthritis, degenerative joint diseases, and the like, many such agents have a number of undesirable side effects, such as gastric irritation and the like.

SUMMARY OF THE INVENTION

In accordance with the present invention, novel 1H-pyrazolo[4,3-c]quinol-4(5H)-one-3-carboxylic acids are provided having the following general formula:

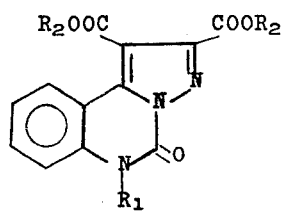

wherein $R_1$ is a monovalent group selected from the group consisting of methyl, benzyl, and monosubstituted benzyl in which the substituent is fluoro, chloro, or bromo.

The compounds of the present invention are prepared by the process which comprises hydrolyzing under alkaline conditions a pyrazolo[1,5-c]quinazolin-5(6H)-one having the general formula,

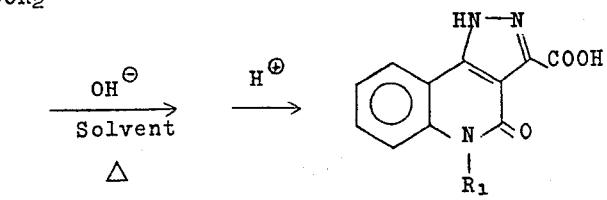

wherein $R_1$ is as defined above and $R_2$ is hydrogen of $C_1-C_3$ alkyl.

The hydrolysis is carried out in an aqueous medium in the presence of a strong base and at a temperature of from about 40°C to the reflux temperature of the reaction medium. When hydrolysis is complete, the free acid is obtained by making the reaction medium acidic.

The compounds of the present invention are useful as anti-inflammatory agents.

DETAILED DESCRIPTION OF THE INVENTION

Examples of compounds coming within the general formula for the 1H-pyrazolo[4,3-c]quinol-4(5H)-one-3-carboxylic acids of the present invention include, among others, 5-Methyl-1H-pyrazolo[4,3-c]quinol-4(5H)-one-3-carboxylic acid 5-Benzyl-1H-pyrazolo[4,3-c]quinol-4(5H)-one-3-carboxylic acid 5-(2-Fluorobenzyl)-1H-pyrazolo[4,3-c]quinol-4(5H)-one-3-carboxylic acid 5-(3-Bromobenzyl)-1H-pyrazolo[4,3-c]quinol-4(5H)-one-3-carboxylic acid 5-(4-Chlorobenzyl)-1H-pyrazolo[4,3-c]quinol-4(5H)-one-3-carboxylic acid Examples of preferred compounds of the present invention include 5-Methyl-1H-pyrazolo[4,3-c]quinol-4(5H)-one-3-carboxylic acid 5-(4-Chlorobenzyl)-1H-pyrazolo[4,3-c]quinol-4(5H)-one-3-carboxylic acid The process of the present invention can be represented by the following equation:

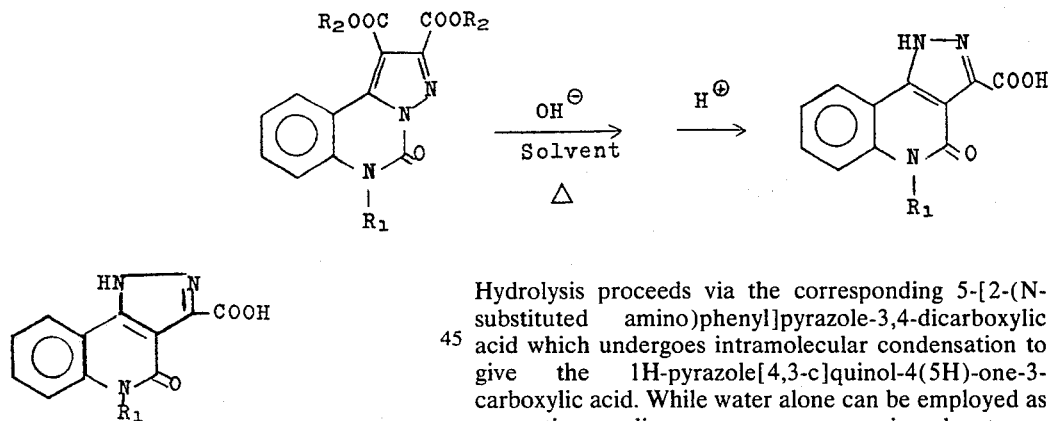

Hydrolysis proceeds via the corresponding 5-[2-(N-substituted amino)phenyl]pyrazole-3,4-dicarboxylic acid which undergoes intramolecular condensation to give the 1H-pyrazole[4,3-c]quinol-4(5H)-one-3-carboxylic acid. While water alone can be employed as a reaction medium, an aqueous-organic solvent medium is preferred in order to increase the solubility of the pyrazolo[1,5-c]quinazolin-5(6H)-one. In general, any organic solvent can be used which is water soluble and inert under the conditions of the reaction. Examples of such solvents include ketones, such as acetone and methyl ethyl ketone; alkanols, such as methanol, ethanol, propanol, and isopropanol; cyclic ethers, such as tetrahydrofuran, 1,3-dioxane, and 1,4-dioxane; miscellaneous solvents such as dimethyl sulfoxide; and the like. The alkanols are preferred, with methanol and ethanol being most preferred. The ratio of water to organic solvent is not critical. Conveniently, the water:organic solvent ratio (v/v) will be 1:1, although more or less organic solvent can be employed if desired. The total amount of water or aqueous organic solvent employed also is not critical, provided adequate agitation can be maintained. Typically, the total amount of solvent will constitute from about 75 to about 95 percent by weight of the total reaction mixture. As indicated hereinbefore, the hydrolysis is carried out in the presence of a strong base which can be inorganic or organic and which is significantly soluble in water. Examples of such bases include, among others, alkali metal hydroxides, such as lithium hydroxide, sodium hydroxide, potassium hydroxide, rubidium hydroxide, and cesium hydroxide; alkali metal carbonates, such as lithium carbonate, sodium carbonate, potassium carbonate, rubidium carbonate, and cesium carbonate; alkaline earth metal hydroxides, such as calcium hydroxide, strontium hydroxide, and barium hydroxide; other nontransition metal hydroxides, such as thallous hydroxide; quaternary ammonium hydroxides, such as ammonium hydroxide, tetramethylammonium hydroxide, tetraethylammonium hydroxide, methyltriethylammonium hydroxide, and dimethyldiethylammonium hydroxide; and the like. Preferably, the base will be substantially, i.e., greater than about 50 percent, soluble in the reaction medium; most preferably, the base will be completely soluble. The preferred bases are the alkali metal hydroxides, with potassium hydroxide being most preferred. At least two equivalents of base, e.g., two moles of a preferred base, per mole of pyrazolo-[1,5-c]quinazolin-5(6H)-one should be used. However, an excess of base is preferred, which excess can range from about 3.5 equivalents to about 20 equivalents or more of base per mole of pyrazolo[1,5-c]quinazolin-5(6H)-one. The hydrolysis reaction is carried out at a temperature of from about 40°C to the reflux temperature of the reaction medium, with heating at reflux being preferred. The reaction time is not critical, and can vary from about 5 minutes to about 12 hours. Preferably, the reaction time will be in the range of from about 10 minutes to about 6 hours. When hydrolysis is complete, the 1H-pyrazolo[4,3-c]quinol-4(5H)-one-3-carboxylic acid is isolated by rendering the reaction medium acidic according to well-known procedures. Typically, the reaction mixture is cooled and made strongly acidic to precipitate the 1H-pyrazolo[4,3-c]quinol-4(5H)-one-3-carboxylic acid which is isolated and purified in the usual manner.

The pyrazolo[1,5-c]quinazolin-5(6H)-ones used as starting materials in the process of the present invention are prepared by reacting acetylenedicarboxylic acid or a $C_1$–$C_3$ dialkyl acetylene dicarboxylate with a 3-diazoindol-2(3H)-one, as shown by the following equation:

include, among others, aliphatic and aromatic hydrocarbons, halogenated hydrocarbons, ethers, aliphatic esters, miscellaneous solvents such as N,N-dimethylformamide and dimethyl sulfoxide, and the like. Aromatic hydrocarbons are preferred, with benzene and toluene being most preferred. The amount of solvent employed is not critical, but should be sufficient to permit adequate agitation. Normally, equimolar amounts of the two reactants are employed, although an excess of the acetylene compound can be used, if desired. Reaction time can vary from about 15 minutes to about 24 hours and the reaction temperature usually will be in the range of from about 40° to about 150°C.

Examples of particularly suitable pyrazolo[1,5-c]quinazolin-5(6H)-ones include, among others, Dimethyl 6-methylpyrazolo[1,5-c]quinazolin-5(6H)-one-1,2-dicarboxylate Dipropyl 6-benzylpyrazolo[1,5-c]quinazolin-5(6H)-one-1,2-dicarboxylate Diethyl 6-(3-fluorobenzyl)pyrazolo[1,5-c]quinazolin-5(6H)-one-1,2-dicarboxylate In carrying out the above-described reaction, the acetylene compound preferably will not contain carboxy groups; i.e., $R_2$ preferably is not hydrogen. An unprotected carboxy group can react with the diazo moiety of the 3-diazoindol-2(3H)-one to give an ester.

The acetylenedicarboxylic acid and $C_1$–$C_3$ dialkyl acetylenedicarboxylates in general are commercially available or readily prepared by well-known procedures. Examples of dialkyl acetylenedicarboxylates include dimethyl acetylenedicarboxylate, diethyl acetylenedicarboxylate, dipropyl acetylenedicarboxylate, and diisopropyl acetylenedicarboxylate.

The 3-diazoindol-2(3H)-ones are prepared in accordance with known procedures. See, for example, J. M. Machowski, *Tetrahedron Letters*, 1773 (1967) and M. P. Cava, et al., *J. Am. Chem. Soc.*, 80, 2257 (1958). Briefly, the appropriate isatin compound is treated with p-toluenesulfonylhydrazine. The resulting hydrazone then is treated with aluminum oxide to give the desired 3-diazoindol-2(3H)-one. The preparation of the required isatin compound is well known in the art. The required N-substituted isatin is obtained by N-alkylation of the parent compound with an alkyl or aralkyl halide in the presence of a strong base such as,

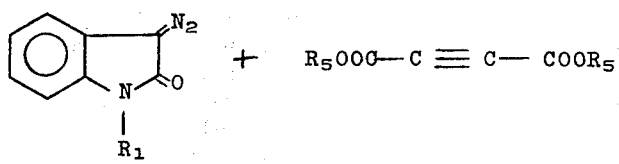 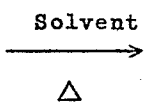

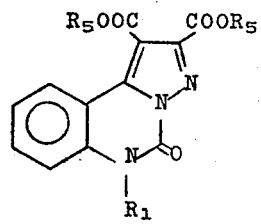

Typically, the reaction is carried out by heating at reflux a benzene solution of approximately equimolar amounts of the acetylene compound and a 3-diazoindol-2(3H)-one. The reaction mixture then is worked up according to known procedures. The reaction in general is carried out in a solvent which is inert to both of the reactants. Examples of suitable solvents for example, sodium hydride.

Examples of suitable 3-diazoindol-2(3H)-ones include

1-Methyl-3-diazoindol-2(3H)-one

1-Benzyl-3-diazoindol-2(3H)-one 1-(4-Chlorobenzyl)-3-diazoindol-2(3H)-one

Anti-inflammatory activity is established by means of the carrageenin-induced edema test of C. A. Winter, et al., *Proc. Soc. Exp. Biol. Med.*, 111, 544 (1962).

To utilize a compound of the present invention as an anti-inflammatory agent, such compound is administered to a mammal in an effective amount, typically, a dose of from about 10 to about 150 mg/kg of mammal body weight. The compound in general can be administered orally, parenterally, or in the form of rectal suppositories.

The compound preferably is employed in combination with one or more adjuvants suited to the particular route of administration. Thus, in the case of oral administration, the compound is modified with pharmaceutical diluents or carriers, such as lactose, sucrose, starch powder, cellulose, talc, magnesium stearate, magnesium oxide, calcium sulfate, acacia powder, gelatin, sodium alginate, sodium benzoate, and stearic acid. The resulting composition can be formulated into tablets or enclosed in capsules for convenient administration. The compound also can be mixed with an appropriate liquid and administered as an elixir, suspension, or the like. In the case of parenteral administration, the compound to be used is conveniently formulated in saline to constitute an injectable liquid solution or suspension. Other adjuvants and modes of administration are known to those skilled in the art. If desired, the pharmaceutical composition can contain, in addition to a compound of the present invention, one or more other pharmacologically-active substances, such as acetylsalicyclic acid, α-d-propoxyphene, caffeine, and acetaminophen (N-acetyl-p-aminophenol).

The present invention is more fully described, without intending to limit it in any manner, by the following examples which illustrate the preparation of certain 1-H-pyrazolo[4,3-c]quinol-4(5H)-one-3-carboxylic acids of the present invention. In the examples, all temperatures are in degrees centigrade unless otherwise specified.

EXAMPLE 1

Preparation of 5-methyl-1H-pyrazolo[4,3-c]quinol-4(5H)-one-3-carboxylic acid.

A mixture of 4.5 g of dimethyl 6-methylpyrazolo[1,5-c]-quinazolin-5(6H)-one-1,2-dicarboxylate, 100 ml of 10 percent aqueous potassium hydroxide, and 100 ml of methanol was heated at reflux for 10 minutes. Methanol then was distilled under reduced pressure. The remaining solution was cooled and acidified with concentrated hydrochloric acid, resulting in the precipitation of 3.5 g (92 percent) of crude product, mp 317°–323°. The material was recrystallized from aqueous N,N-dimethylformamide to give pure 5-methyl-1H-pyrazolo[4,3-c]quinol-4(5H)-one-3-carboxylic acid, mp 319°–323°. The following elemental analysis was obtained:

Calculated for $C_{12}H_9N_3O_3$: C, 59.26; H, 3.73; N, 17.27. Found: C, 59.27; H, 3.75; N, 17.51.

EXAMPLE 2

Preparation of 5-(4-chlorobenzyl)-1H-pyrazolo[4,3-c]quinol-4(5H)-one-3-carboxylic acid.

The procedure of Example 1 was repeated, using 50 g of dimethyl 6-(4-chlorobenzyl)pyrazolo[1,5-c]quinazolin-5(6H)-one-1,2-dicarboxylate, 500 ml of 10 percent aqueous potassium hydroxide, and 500 ml of methanol; reaction time was 30 minutes. The yield of crude product was 38.4 g (87 percent), mp 295°–298°. Recrystallization of the crude material gave pure 5-(4-chlorobenzyl)-1H-pyrazolo[4,3-c]quinol-4(5H)-one-3-carboxylic acid, mp 305°–309°. The following elemental analysis was obtained:

Calculated for $C_{18}H_{12}ClN_3O_3$: C, 60.97; H, 3.64; N, 11.85; Cl, 10.00. Found: C, 60.88; H, 3.46; N, 11.90; Cl, 10.24.

What is claimed is:

1. A 1H-pyrazolo[4,3-c]quinol-4(5H)-one-3-carboxylic acid of the formula,

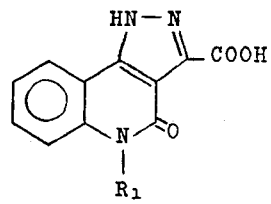

wherein $R_1$ is a monovalent group selected from the group consisting of methyl, benzyl, and monosubstituted benzyl in which the substituent is fluoro, chloro, or bromo.

2. The compound of claim 1, which compound is 5-methyl-1H-pyrazolo[4,3-c]quinol-4(5H)-one-3-carboxylic acid.

3. The compound of claim 1, which compound is 5-(4-chlorobenzyl)-1H-pyrazolo[4,3-c]quinol-4(5H)-one-3-carboxylic acid.

4. A process for preparing a compound of claim 1 from a pyrazolo[1,5-c]quinazolin-5(6H)-one of the formula,

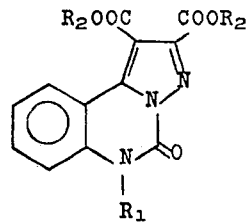

wherein $R_1$ is as defined in claim 1 and $R_2$ is hydrogen or $C_1$–$C_3$ alkyl, which process comprises the steps of:

A. hydrolyzing the pyrazolo[1,5-c]quinazolin-5-(6H)-one in an aqueous medium in the presence of at least two equivalents of a strong base and at a temperature of from about 40°C to the reflux temperature of the reaction medium, and B. acidifying the hydrolysis reaction medium to obtain the 1H-pyrazolo[4,3-c]quinol-4(5H)-one-3-carboxylic acid.

5. The process of claim 4, wherein $R_2$ is $C_1$–$C_3$ alkyl.

6. The process of claim 5, wherein an aqueous-organic solvent medium is employed.

7. The process of claim 6, wherein the hydrolysis is carried out at the reflux temperature of the reaction medium.

8. The process of claim 6, wherein the organic solvent is ethanol.

9. The process of claim 5, wherein the base is an alkali metal hydroxide.

10. The process of claim 9, wherein the base is potassium hydroxide.

* * * * *